Oct. 30, 1962 M. COZZOLI 3,061,355
HELICOPTER CARGO HOOK
Filed June 2, 1961 4 Sheets-Sheet 1

INVENTOR
MICHAEL COZZOLI
BY Mason, Mason & Albright
ATTORNEYS

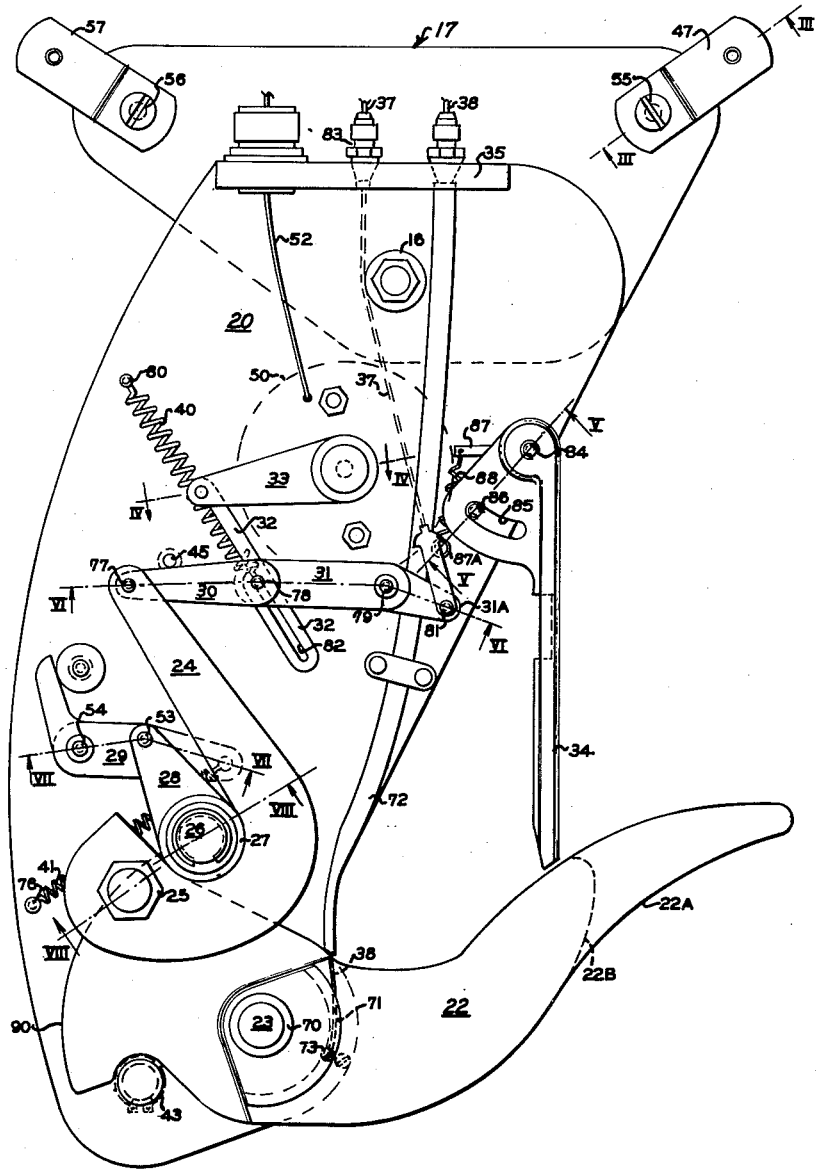

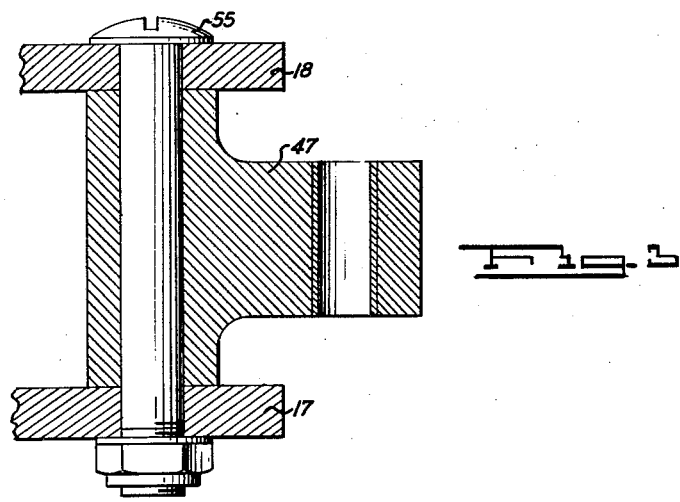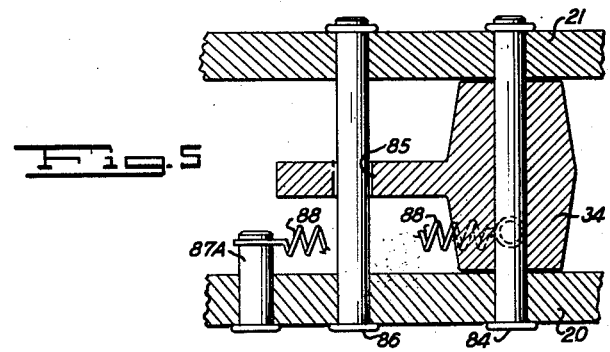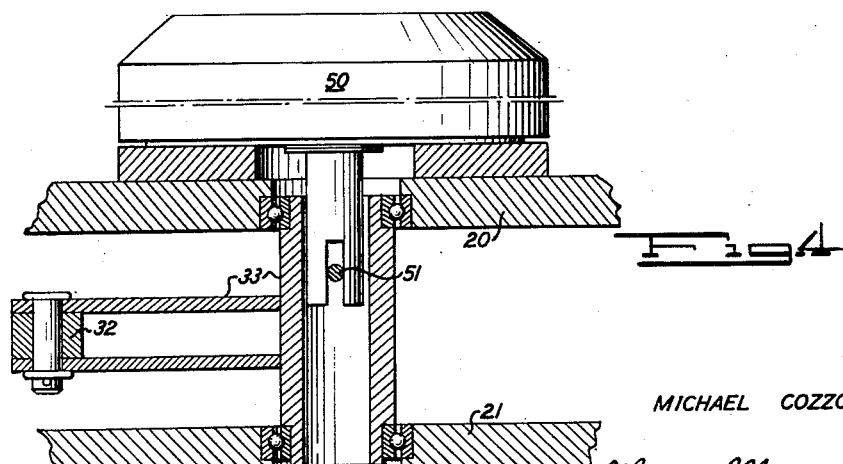

Oct. 30, 1962 M. COZZOLI 3,061,355
HELICOPTER CARGO HOOK
Filed June 2, 1961 4 Sheets-Sheet 4
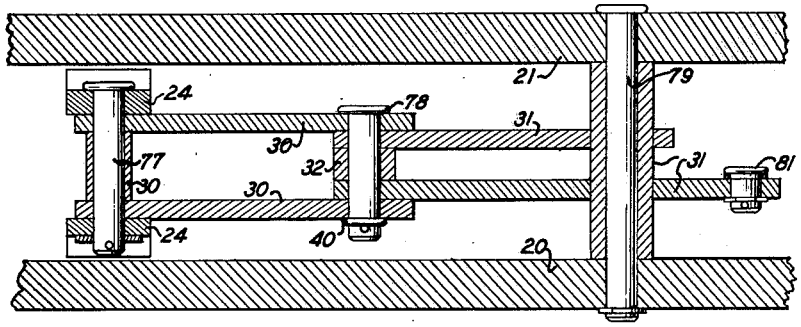
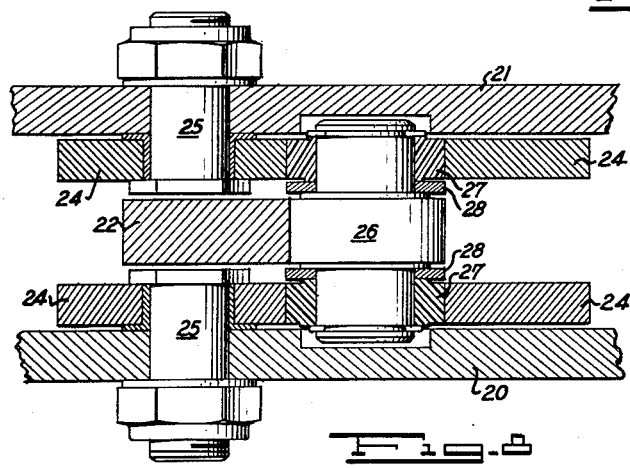
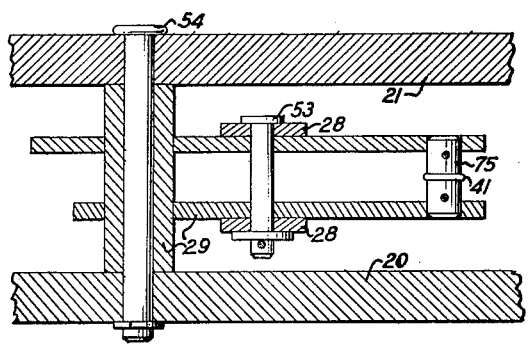
INVENTOR
MICHAEL COZZOLI
BY *Mason, Mason & Albright*
ATTORNEYS

United States Patent Office 3,061,355
Patented Oct. 30, 1962

3,061,355
HELICOPTER CARGO HOOK
Michael Cozzoli, 2201 Pennsylvania Ave.,
Hagerstown, Md.
Filed June 2, 1961, Ser. No. 114,380
11 Claims. (Cl. 294—83)

This invention relates to a helicopter cargo hook, and more particularly to a helicopter cargo hook control for engagement and disengagement of the hook within the helicopter.

The helicopter has proved itself as an effective means for transportation of personnel, equipment and supplies from one point to another. However, as its cargo compartments are usually too small to accommodate bulky equipment, transportation of said equipment is frequently accomplished by fastening it to an external hook suspended from the helicopter. The hooks presently utilized for this purpose require a ground crew to engage the cargo while the helicopter hovers above. There are many disadvantages in this arrangement. For one thing, the downdraft from the helicopter together with the dust cloud which it often creates makes it hazardous for the ground crew to engage a load on the hook. Also the static electricity which is also present and requires grounding is a hazard in itself. Moreover, the possibility of a gust of wind or unexpected maneuver of the helicopter is a constant danger to the ground crew.

It is evident that under these conditions the presently-used system is inadequate and that a hook is needed which will permit the engagement of a load without the necessity of a ground crew. Similarly, such a hook should also be able to release the load from the aircraft upon reaching its destination without the intervention of a ground crew. Furthermore, the hook should be capable of being reset from the aircraft in order to permit the picking up of additional loads without the necessity of having to land the aircraft.

Another desirable feature is to be able to jettison the load in flight in case of any malfunctioning of the helicopter. Thus any release mechanism for the cargo hook should be operative even if the load may drag on the ground or assume an angular relationship in relation to the aircraft in flight.

In seeking a hook which will operate in the foregoing manner, there are certain mechanical limitations and practical considerations which must be borne in mind. For example, for a mechanical release or resetting to the hook, the force required for such release or resetting should be less than the weight of the hook. If it is otherwise, mechanical actuation of the release or reset under no-load conditions would move the hook rather than release it. On the other hand, the force to release the hook with a full load should not exceed that which a person can exert comfortably in executing a manual release, or in any event that which an electrical actuator can exert—which, in turn, is limited to the power available in the aircraft, normally 24 to 28 volts and a maximum of 15 amperes of D.C. current. Also since a hovering helicopter is not stable, the hook should be designed so as to assist the engagement by guiding the sling adapter onto the hook. It will additionally be appreciated that the capacity of these hooks being generally high in a relative sense—for example, a capacity requirement as high as five tons is not unusual—that the loads which may be imposed on the release mechanism are relatively high. Moreover, since the hook will be exposed to extremes of weather and frequent dust conditions created by the helicopter, the design must allow for effective operation with relatively broad tolerances of the cooperating parts.

Several attempts have been made to create a hook to meet the foregoing requirements which have depended on a fixed inclined plane principle to obtain the necessary high mechanical advantage. However, tests have shown that due to manufacturing tolerances and wear of the sliding parts, these hooks could not be relied upon to hold the loads at all times, and a number of malfunctions in flight have been reported where there has been a complete loss of the load.

The object of this invention is to produce a cargo hook with a high degree of reliability which will meet the above requirements.

The invention is illustrated in the preferred embodiment in the accompanying drawings in which:

FIGURE 2 is a side view of the cargo hook with the front cover plate removed;

FIGURE 3 is a section view taken on lines III—III of FIGURE 2;

FIGURE 4 is a section view taken on lines IV—IV of FIGURE 2;

FIGURE 5 is a section view taken on lines V—V of FIGURE 2;

FIGURE 6 is a section view taken on lines VI—VI of FIGURE 2;

FIGURE 7 is a section view taken on lines VII—VII of FIGURE 2;

FIGURE 8 is a section view taken on lines VIII—VIII of FIGURE 2;

Figure 11:
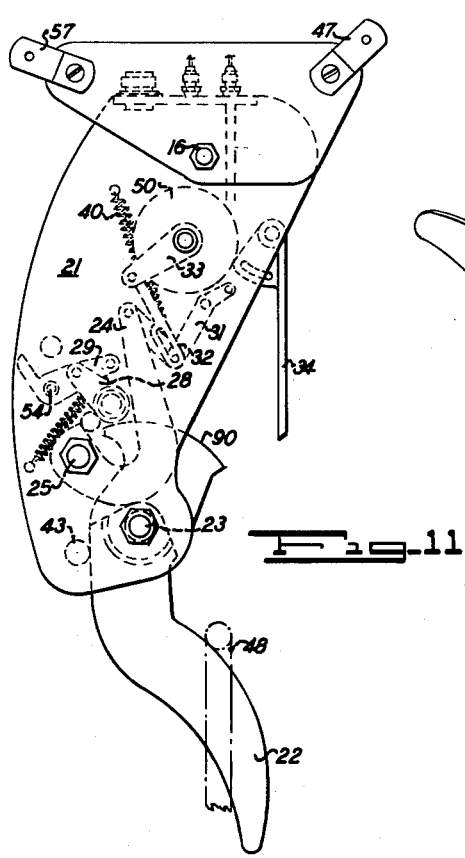
Figure 10:
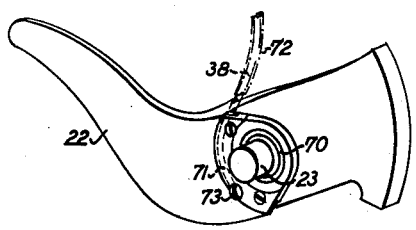

FIGURE 10 is a partial perspective view of load beam 22, and bearing 70 showing the means of attachment of the reset cable 72; and FIGURE 11 is a view similar to FIGURE 2 but showing the cargo hook in opened position.

It is to be understood that although the invention described herein is for an engaging and remotely controlled cargo hook specially designed for helicopter operation, the scope of the invention is not limited to this specific application.

Figure 1:
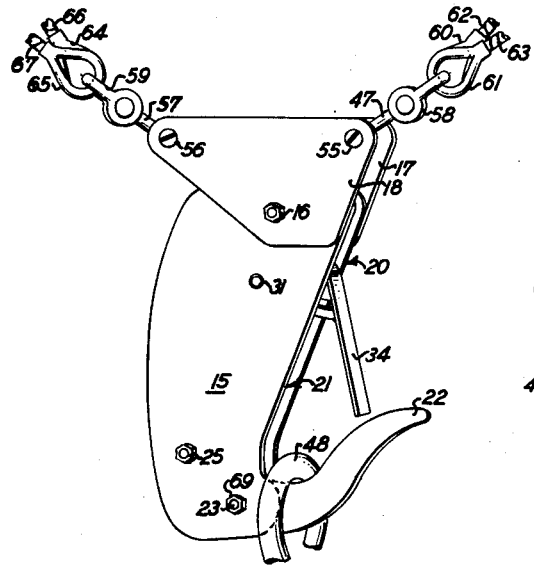
FIGURE 1 is a perspective view of the cargo hook.

Referring now particularly to FIGURES 1 and 2, the cargo hook 15 is pivotally supported by a spacer bushing 16 which connects two adapter plates 17 and 18. Shackle adapters 47 and 57 which are similar to each other in construction connect the adapter plates 17 and 18 at their fore and aft aspects by means of bolts 55 and 56 respectively. FIGURE 3 shows shackle adapter 47 in cross-section. Connected to the shackle adapters 47 and 57 are shackles 58 and 59 respectively. Shackle 58 is embraced by the terminal loops 60 and 61 of a pair of suspension cables 62 and 63 which are attached to a helicopter (not shown) at their opposite ends. Similarly, shackle 59 is connected to the helicopter through the terminal loops 64 and 65 of a pair of suspension cables 66 and 67.

Figure 9:
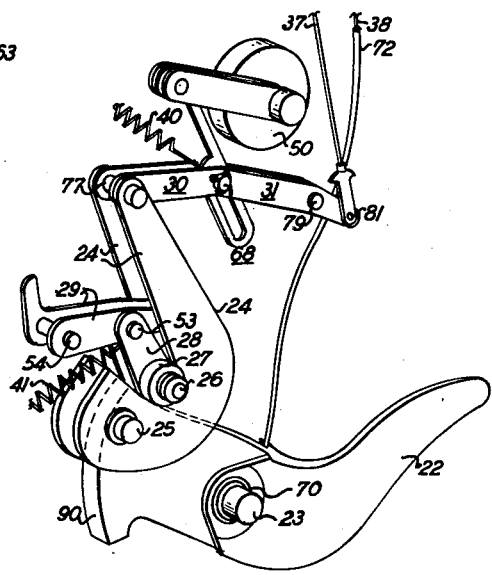
FIGURE 9 shows the internal linkage of the cargo hook in perspective.

The cargo hook 15 consists of two side plates 20 and 21. Bridging the side plates 20 and 21 at their upper aspect is a support plate 35. The side plates 20 and 21 serve to guard and support the linkage assembly 68 (see FIGURE 9). The hook portion of load beam 22 extends forwardly from the lower aspect of the cargo hook 15. The figures show the load beam 22 with an extended guide portion 22A to guide a sling 48 onto the cargo hook. Alternately, the load beam may be shortened as shown by the dotted lines 21B. Load beam 22 incorporates a bearing 70 which receives the load beam pivot bolt 23. Thus load beam 22 may pivot about load beam pivot bolt 23 which, in turn, is supported by side plates 20 and 21 and secured by any appropriate securing means as, for example, nut 69. As shown best in FIGURE 10, there is a groove 71 in load beam 22 which extends partially around the forward portion of bearing 70. A reset cable 38 within guide 72 is led into groove 71 and secured therein by suitable means such as screw 73. It will readily be appreciated that when reset cable is pulled upward, the forward portion of load beam 22 is pivoted upward or counter-clockwise (as seen from FIGURE 2) around the load beam pivot bolt 23 until the corresponding downward motion of the after end of load beam 22 is terminated by load beam stop 43.

The forward weight in the hook portion of load beam 22 exceeds the after weight in the heel or holding portion so that unless secured as shown in FIGURE 2, the load beam 22 will of its own weight rotate clockwise to the position shown in FIGURE 11. However, this is prevented because load beam 22 is locked in the position shown in FIGURE 2 by reaction means comprising load beam reaction roller 26 and the reaction beam rollers 27 (see FIGURE 8) which are received in the crook of a J-shaped lever comprising reaction beams 24. It will be understood that in the position shown in FIGURE 2, that the force applied to the load beam reaction rollers from load beam 22 is 180°, measuring around the crook of reaction beams 24, from where the reaction beam rollers 27 relay the force against reaction beams 24. Thus as long as the reaction beams 24 are in the position shown in FIGURE 2, the load beam reaction roller 26 together with the reaction beam rollers 27 will be maintained in position—squeezed between load beam 22 and reaction beams 24.

Extending upwardly from each reaction beam roller 27 are roller links 28. These are pivotally connected by pin 53 at their upper aspect to roller bell crank 29 which, in turn, is pivoted in at its after portion on pin 54 secured between side plates 20 and 21 (see FIGURE 7). Forward on roller bell crank 29 is a connecting member 75 which receives a resilient member consisting of a spring 41 connected to a pin 76. Spring 41 applies a downward force through bell crank 29 and roller links 28 to push rollers 26 and 27 into the crook of reaction beams 24.

Reaction beam pivot bolts 25 provide the lower pivot for the reaction beams 24 (see FIGURES 2 and 8). The horizontal axis of bolts 25 falls slightly below an imaginary plane which intercepts the axis of reaction beam rollers 27 and the points wherein the reaction beams 24 are tangential to said rollers 27.

The upper ends of reaction beams 24 are pivoted at pin 77 to the release link 30 (see FIGURES 2 and 6). The upward movement of link 30 around pin 77 is limited by release linkage stop 45 which projects between side plates 20 and 21. Pin 78 links release link 30 and release lever 31 which pivots around cross-bolt 79 secured between side plates 20 and 21. The release link 30 together with the release lever 31 form a toggle locking means which, with the reaction beams 24 exerting a forwardly acting force, are locked in place as shown in FIGURE 2. A resilient member comprising the release linkage return spring 40 which is secured at one end to pin 78 and at the other end to a pin 80 secured between side plates 20 and 21 provides an additional force which tends to maintain reaction link 30 and reaction lever 31 in the position shown in FIGURE 2.

A projection 31A of release lever 31 extends forwardly to connect with the release cable 37 at pin 81 whereby when release cable 37 is pulled upwardly, release lever 31 is revolved counter-clockwise about pin 79 to break the aforesaid toggle lock. This lock can also be broken by causing the electric actuator link 32 to turn downward or counter-clockwise by means of an electric actuator bell crank 33 pivotally connected to actuator link 32 and turned by a rotary solenoid 50 which engages a pin 51 secured relative to crank 33. Solenoid 50 is detachably connected through wires 52 to a suitable electric power source in the helicopter. The actuator link 32 contains a longitudinal opening 82 adapted to receive pin 78 so that link 32 will not inhibit the breaking of the toggle lock when release cable 37 is pulled. The spacer bushing 16 and bushing 83 are in such relation as to insure that release cable 37 is fed directly about bushing 16 into bushing 83 in the support plate 35.

A keeper 34 extends downwardly from between side plates 20 and 31 from a pin 84 supported by said plates to the proximity of load beam 22. Keeper 34 can yieldably be forced in a clockwise direction about pin 84 within the limits of movement proscribed by the length of opening 85 and its engagement with pin 86 which is secured to side plate 20. A spring 88 connected relative to plates 20 and 21 at pin 87A on one end and to a projection 87 extending aft from keeper 34 tends to hold keeper 34 outward as shown in FIGURE 2.

Prior to a helicopter pick-up, a load is prepared on the ground in such a way as to have a semi-flexible annular sling adapter 48 anchored on top of the load which stands vertically. A helicopter descends in the vicinity of the load and the pilot guided by a crew member to whom the hook and load are visible maneuvers the hook to engage the load. The load is applied to the load beam 22 through the adapter sling 48 as shown in FIGURE 1. The helicopter then rises and carries the load suspended from the hook. As the adapter plates 17 and 18 are relatively fixed when the suspension cables 62, 63, 66 and 67 from the helicopter are attached to the shackle adapters 47 and 57, the cargo hook 15 is free to rotate or swing fore and aft about the spacer bushing 16. This single point suspension of the cargo hook is an important feature inasmuch as it permits the cargo hook to align itself to any attitude the load may take, both in dragging on the ground and in flight.

On reaching its destination the helicopter descends until the load touches the ground at which time the pilot or a crew member releases the hook by either manually pulling cable 37 or the electrical means at his disposal. The electrical release is accomplished when rotary solenoid 50 is energized by the closing of a switch by the pilot or crew member which causes actuator bell crank 33 to rotate and through actuator link 32 break the toggle joint at pin 78.

It will be appreciated that although a rotary solenoid is used in this application any other type of electric or pneumatic actuator may be employed to move the mechanism to its release position.

When a load is applied to the load beam 22 as shown in FIGURE 1 this load is reacted at two points: (1) at the load beam pivot bolt 23 and from here to the side plates 20 and 21, and (2) against the load beam reactor roller 26 to the reaction rollers 27 to the reaction beam 24. Here the load is divided and reacts at the reaction beam pivot bolts 25 to the side plates 20 and 21 and the other component reacts through the release links 30 and release lever 31 to the release lever pivot bolt 79 and finally to the side plates 20 and 21.

It should be noted that since the reaction beams 24 together with the load beam 22 grasps rollers 26 and 27 180° apart, there is no tendency of rollers 26 and 27 to move upward and thereby free load beam 22 to rotate clockwise about the load beam pivot bolt 23 until it strikes the load beam stop 43. This condition assures positive locking and precludes any premature release of the hook under any load condition. To release the mechanism it is only necessary to apply a small upward force on the release cable 37 to break the toggle joint formed by links 30 and lever 31. When this is accomplished reaction beams 24 pivot about their pivot bolts 25. Rollers 26 and 27 are then no longer grasped at point 180° apart and rollers 26 and 27 will move upward due to the clockwise force from load beam 22. This force will also assist in moving links 30 and lever 31 which form the toggle to the fully released position shown in FIGURE 11. As long as the load beam 22 is in the released position shown in FIGURE 11 the cam surface 90 on the after end of load beam 22 holds the complete mechanism in the released position. When force on release cable 37 is relieved, the release linkage return spring 40 returns its linkage to the locked position shown in FIGURE 2.

To reset the hook it is merely necessary to pull on the reset cable 38 until load beam 22 strikes the load beam stop 43. When this occurs, the roller linkage return spring 41 will return its linkage to the locked position shown in FIGURE 2.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. A cargo hook comprising a side plate, a load beam having a forward hook portion, an after holding portion and pivot means between said portions, said load beam's center of gravity being in said hook portion, said pivot means pivotally connecting said load beam to said side plate, a lever pivoted to said side plate on one end, securing means locking the opposite end of said lever relative to said side plate, first and second resilient means, said securing means yieldably positioned in its locking position by said first resilient means, reactions means yieldably positioned by said second resilient means between said lever and said holding portion of said load beam thereby holding said load beam in closed position and transmitting reaction from said load beam to said lever against said securing means, lever releasing means for selectively releasing said lever from said securing means permitting said lever to pivot whereby the position of said reaction means is modified to allow said load beam to open, and closing means for said load beam whereby when said load beam closes said first resilient means resets said lever securing means to lock said lever relative to said side plate and said second resilient means resets said reaction means between said lever and said holding portion of said load beam to hold the latter in closed position.

2. A cargo hook comprising a load beam having a forward hook portion and an after portion, pivot means disposed between said hook and said after portion of said load beam, said pivot means pivotally connecting said load beam to said side plate, a lever pivoted at one end to said side plate, lever locking means including a toggle connected to said lever and to said side plate locking the end of lever opposite its pivot relative to said side plate, first and second resilient means, said toggle yieldably maintained in its locked position by said first resilient means, reaction means yieldably positioned by second resilient means between said lever and said holding portion of said load beam holding it in closed position and transmitting said load beam's reaction force to said lever against said toggle, toggle unlocking means for moving said toggle into unlocked position permitting said lever to pivot relative to said side plate whereby said reaction means' position is modified to allow said load beam to open, and closing means for said load beam whereby when said load beam is closed said first resilient means repositions said toggle to lock said lever relative to said side plate and said second resilient means repositions said reaction means between said lever and said holding portion of said load beam to hold the latter in closed position.

3. A cargo hook comprising a side plate, a load beam including a forward hook portion and an after portion, pivot means disposed between said portions of said load beam, the center of gravity of said load beam being in said hook portion, said pivot means pivotally connecting said load beam to said side plate, a J-shaped lever, lever pivot means disposed in the short leg of said J-shaped lever pivoting said lever relative to said side plate, lever securing means selectively securing the free end of the long leg of said lever relative to said plate, first and second resilient means, said securing means yieldably positioned by said first resilient means, reaction means yieldably positioned by said second resilient means in the crook of said J-shaped lever and between said lever and said holding portion of said load beam holding it in closed position, said reaction means transmitting said load beam's reaction force to said lever against said securing means permitting said lever to turn on its pivot whereby the position of said reaction means is modified to allow said load beam to open, and closing means for said load beam whereby when said load beam closes said first resilient means repositions said lever securing means to lock said lever relative to said side plate and said second resilient means repositions said reaction means between said lever and said holding portion of said load beam to hold the latter in closed position.

4. A cargo hook comprising a side plate, a load beam having a forward hook portion and an after holding portion, pivot means disposed between said portions of said load beam, the center of gravity of said load beam being in said hook portion, said pivot means pivotally connecting said load beam to said side plate, a J-shaped lever pivoted to said side plate on its short leg, lever securing means locking the free end of the long leg of said J-shaped lever relative to said side plate, first and second resilient means, said securing means yieldably positioned in its locked position by said first resilient means, reaction roller means yieldably positioned by said second resilient means in the crook of said J-shaped lever and between said lever and said holding portion of said load beam holding said load beam in a closed position, said reaction roller means transmitting reaction force from said load beam to said lever against said securing means, lever unlocking means for unlocking said lever securing means permitting said lever to pivot whereby the position of said reaction roller means is modified to allow said load beam to open, and closing means for said load beam whereby when said load beam is closed said first resilient means repositions said lever securing means to lock said lever relative to said side plate and said second resilient means repositions said reaction roller means between said lever and said holding portion of said load beam holding said load beam in closed position.

5. A cargo hook comprising a side plate, a load beam having a forward hook portion and an after holding portion, pivot means disposed between said portions with connection to said side plate, the center of gravity of said load beam being in said hook portion, a J-shaped lever pivoted to said side plate on its short leg, lever securing means locking the long leg of said J-shaped lever relative to said side plate, a first and second resilient means, said securing means yieldably positioned by said second resilient means in the crook of said J-shaped lever and between said lever and said holding portion of said load beam thereby holding it in closed position and transmitting reaction force from the load beam to said lever and against said securing means, the direction of force against said reaction roller means being in a line which lies between said pivot means for said J-shaped lever and said lever securing means' association with said J-shaped lever, lever unlocking means for unlocking said lever securing means permitting said lever to pivot whereby the position of said reaction roller means is modified to allow said load beam to open, and closing means for said load beam whereby when said load beam closes said first resilient means repositions said lever securing means to lock said lever relative to said side plate and said second resilient means repositions said reaction roller means into the crook of said J-shaped lever and between said lever and said holding portion of said load beam holding said load beam in closed position.

6. A cargo hook comprising a side plate, a load beam having a forward load-bearing portion and an after holding portion, pivot means disposed between said portions of said load beam, said pivot means pivotally connecting said load beam to said side plate, the center of gravity of said load beam being in said portion for load-bearing, a lever having one end pivoted to said side plate, lever securing means selectively locking the other end of said lever relative to said side plate, positioning means, said securing means operatively associated with said positioning means, reaction means operatively associated with said lever, said reaction means bearing on said holding portion of said load beam holding said load beam in closed position and transmitting said load beam's reaction force to said lever against said securing means, control means for said lever securing means to unlock said lever and permit said lever to pivot whereby said reaction means moves to allow said load beam to open, and closing means for said load beam whereby when said load beam closes said positioning means repositions said lever securing means to secure said lever relative to said side plate and said reaction means is repositioned to bear on said holding portion of said load beam thereby holding the latter in closed position.

7. Structure according to claim 6 wherein said control means comprises a rotary solenoid.

8. Structure according to claim 6 wherein said locking means includes a toggle and said control means comprises a cable interconnected with said toggle.

9. Structure according to claim 6 wherein said cargo hook incorporates a single point suspension.

10. Structure according to claim 6 including a yieldable keeper member depending from said side plate proximate to the forward load bearing portion of the said load beam.

11. A helicopter cargo hook comprising a pair of side plates disposed in a parallel relationship, a load beam with its forward portion constituting the hook part and its after portion constituting holding and cam parts, a pivot means interposed between said hook and holding parts and pivotally connecting said load beam between said side plates, the hook part of said load beam having a greater weight than said holding and cam parts, a J-shaped lever pivoted between said side plates on its short leg end, a toggle connected on one end to said J-shaped lever's long leg and on the other end between said side plates, first and second springs, a toggle movement limit part extending from one of said side plates to limit the upper movement of said toggle, said first spring yieldably maintaining said toggle against said limit part, reaction rollers yieldably positioned by said second spring in the crook of J-shaped lever and squeezed between said lever on one side and said holding part of said load beam on its other side thereby holding said load beam in its closed position and transmitting the reaction force from said load beam to said lever from whence it is transmitted to said toggle, toggle unlocking means for moving said toggle away from said limit part whereby said J-shaped lever is permitted to pivot and said reaction rollers are repositioned by being forced along said J-shaped lever by said holding part and said cam part when said load beam opens, and closing means comprising a cable connected to said load beam to reposition said load beam in its closed position whereby said first spring repositions said toggle against said limit part and said second spring repositions said reaction rollers into the crook of said J-shaped lever and interposes them between said lever and said holding part of said load beam to hold said load beam in closed position.

No references cited.